United States Patent [19]
Larson et al.

[11] 3,927,534
[45] Dec. 23, 1975

[54] WATER INTAKE STRUCTURE

[75] Inventors: Lory E. Larson, Garden Grove; Dallas I. Downs, Montrose, both of Calif.

[73] Assignee: Southern California Edison Company, Rosemead, Calif.

[22] Filed: Jan. 21, 1974

[21] Appl. No.: 435,128

[52] U.S. Cl. .............. 61/17; 61/1; 61/2; 61/21; 137/363; 210/157
[51] Int. Cl.[2] .............. E02B 9/04; E02B 5/08
[58] Field of Search .............. 61/17, 18, 21, 1, 2; 137/363; 210/157, 156, 158, 170

[56] References Cited
UNITED STATES PATENTS

| 300,576 | 6/1884 | Cole | 61/17 |
|---|---|---|---|
| 3,168,813 | 2/1965 | Sockel | 61/17 X |

FOREIGN PATENTS OR APPLICATIONS

| 194,006 | 9/1967 | U.S.S.R. | 61/21 |

*Primary Examiner*—Jacob Shapiro
*Attorney, Agent, or Firm*—Lyon & Lyon

[57] ABSTRACT

There is disclosed herein an improved intake structure for withdrawing water from a body of water of the type having an intake conduit with an upwardly facing intake orifice therein and a velocity cap positioned thereabove. The intake orifice has an outwardly extending lip along its periphery and a velocity cap shaped to at least extend over the intake orifice and lip to define an intake channel between the velocity cap and the lip through which water being drawn into the intake structure flows. The ratio of the width of the lip to the elevation of the velocity cap over the plane of the intake orifice is such that a substantially uniform horizontal velocity profile is established in the water flowing into the intake channel. As a result, substantially all fish being drawn toward the orifice are provided with sufficient time to react to the increase in velocity and swim out of the intake channel back to the body of water.

17 Claims, 5 Drawing Figures

WATER INTAKE STRUCTURE

BACKGROUND OF THE INVENTION

The invention disclosed herein relates to the removal of water from a body of water containing fish under circumstances where it is desired to hold the number of fish drawn in with the water to a minimum. For example, steam electric generating stations utilize cooling water which is circulated through condensers to cool and condense the steam discharge from the turbines. This cooling is essential to the efficiency of the thermocycle. Generating stations located adjacent to an ocean, lake, or river generally pump cooling water directly from the adjacent body of water, pass it through the cooling system one time and then discharge the water. These systems are known as "once through cooling systems."

Such systems normally obtain water from the adjacent body of water by running pipes out into the body of water. Water is drawn into a bowl-like conduit structure having an upwardly facing intake orifice, commonly designated a "riser bowl," and then flows shoreward through the pipe to the pumpwell or screenwell located on the shore where objectionable trash and debris is removed. The essentially debris free water is then pumped through the condenser cooling tubes and returned to the body of water. One problem associated with these systems is that the intake structure forms an artificial reef which attracts fish. The fish are drawn into the intake pipe and are carried with the flow of water to the watercourse associated with the screenwell and pumpwell.

It is known that all species of fish and other aquatic organisms with locomotive ability respond directly to horizontal velocity components in watercourses. The response may be positive, i.e., organisms are attracted to the condition; it may be negative, i.e., they are repelled; or the organisms may be overwhelmed and not able to exercise choice. Not all fishes, or all size classes of any one fish, respond similarly to the same degree of stimulus. However, all do respond to some degree. On the other hand, most species of fish are not responsive to vertical velocity profiles.

Where the primary species of fish encountered react negatively to increases in horizontal velocity, as is the case, for example, in Southern California coastal waters, fish intake has been substantially reduced by placing a solid, substantially horizontal velocity cap over the intake orifice of a conventional intake structure. The velocity cap eliminates the direct downward vertical velocity profile which is present over an uncapped, upwardly facing orifice and creates a horizontal velocity component to flow into the structure. This velocity cap, when used in Southern California coastal waters, was found to be 80 to 90 percent more efficient in reducing fish intake into the system than the conventional open orifice intake structure. However, as steam generating plants increased in size, the volumes of water required for cooling become so great that even that degree of reduction in fish intake still permitted a number of fish to be drawn into the systems.

Therefore, it is an object of the present invention to provide an improved water intake structure which significantly reduces the number of fish drawn in with the intake water.

SUMMARY OF THE INVENTION

It has been determined by the present inventors that the intake of fish in velocity cap systems was caused at least in part by the fact that the velocity of the water at the bottom of the opening between the velocity cap and intake structure was as much as twice that of the velocity at the top of this opening, and that it was in the region of highest velocity that most fish were drawn into the structure. According to the present invention, the number of fish drawn into the system is substantially reduced by providing an intake structure having a substantially uniform horizontal velocity profile extending over a distance sufficient to permit substantially all fish which enter the periphery of the intake flow to react to the horizontal velocity and swim out of the structure. The intake structure of the present invention is provided with an intake conduit communicating with the body of water having an upwardly facing intake orifice therein and a velocity cap having a downwardly facing, substantially horizontal surface mounted above the orifice. The intake orifice is provided with an outwardly extending, substantially horizontal lip on those portions of the periphery of the intake orifice over which water flows. The horizontal surface of the velocity cap is shaped to at least extend over the entire surface of the intake orifice, including the lip provided thereon, to thereby define at least one intake channel between the velocity cap and the lip over which water being drawn through the orifice flows. The width of the lip of the invention is a sufficient multiple of the vertical distance from the top upper surface of the lip to the lower surface of the velocity cap to establish a substantially uniform horizontal velocity profile in the water flowing into the intake channel and to provide a sufficient time for substantially all fish being drawn toward the orifice to react to the increase in velocity and swim out of the intake stream. By substantially uniform velocity profile it is meant herein that the velocity of the water flowing through the intake channel does not vary more than about 0.3 feet per second at any two points along a vertical line between the outer edge of the lip and the surface of the velocity cap when the intake velocity is approximately 2.0 feet per second.

DETAILED DESCRIPTION OF THE INVENTION

Figure 1:
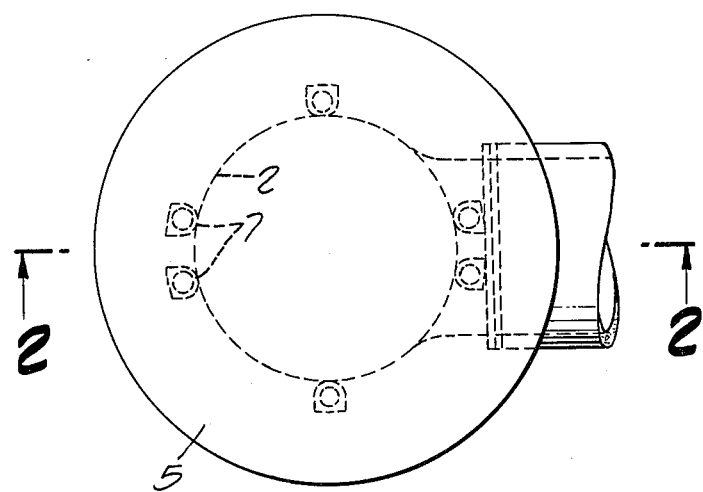
FIG. 1 is a top view of one embodiment of the intake structure of the invention featuring a circular cross-section.
Figure 2:
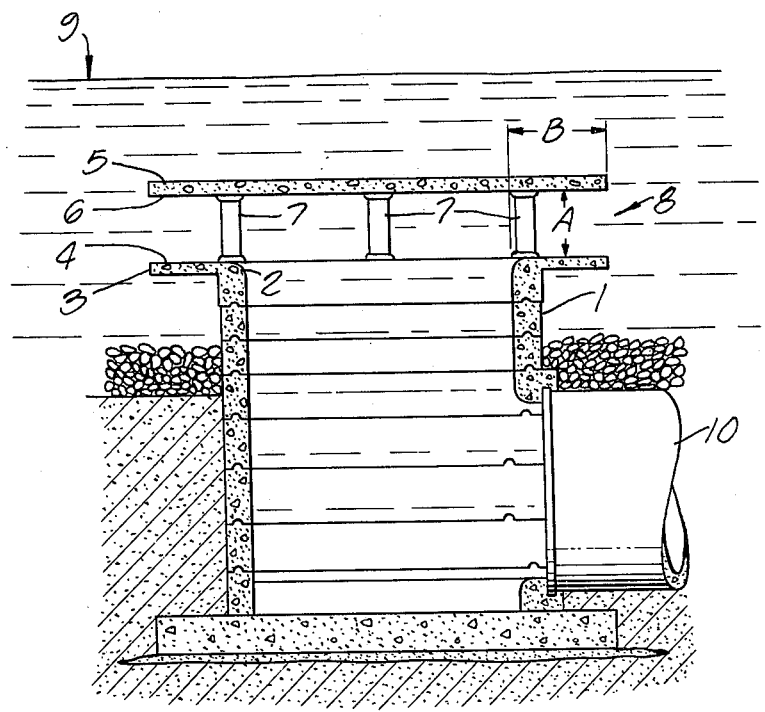
FIG. 2 is a cross-sectional side view of the embodiment depicted in FIG. 1 taken along line 2—2.

In its most basic terms, the invention disclosed herein provides an improved intake structure comprising a lipped intake orifice and a velocity cap mounted above the orifice and lip to define an intake channel between the lip and the velocity cap. Referring to FIGS. 1 and 2 for the purposes of illustration, intake conduit 1 is provided with intake orifice 2 and outwardly extending lip 3 having upwardly facing, substantially horizontal surface 4 in substantially the same plane as the top edge of orifice 2 and extending around the periphery of intake orifice 2. Velocity cap 5 having downwardly facing, substantially horizontal surface 6 at least large enough to extend over the entirety of conduit 1 and lip 3 is mounted over conduit 1 on supports 7 thereby defining intake channel 8 between surfaces 6 and 4 of velocity cap 5 and lip 3, respectively. The distance A between these surfaces must be large enough to permit the intake of the needed volume of water into the system. The width of lip 3 measured from the outside of the lip to the edge of intake orifice 2 is a sufficient multiple of the distance A so that a substantially uniform velocity profile is established in the water flowing into intake channel 8. By substantially uniform velocity profile it is meant herein that the velocity of the water flowing in channel 8 taken at any two points along a vertical line between the outer edge of surface 4 and surface 6 preferably does not vary more than about 0.3 feet per second when the intake velocity is approximately 2.0 feet per second. The ratio of width B to height A must also be sufficient to allow fish passing from water body 9 into channel 8 time to react to the horizontal velocity of the water in channel 8 by swimming out of the channel and back into water body 9. Preferably, the surfaces 6 and 4 are made as flat as possible to prevent any perturbations in the velocity profile.

In choosing the overall dimensions of the intake structure of the invention, consideration is first given to choosing a desirable velocity of the water entering intake channel 8 in relation to the species of fish expected to be encountered in the body of the water where the intake structure is to be located. The minimum velocity below which no substantial decrease in fish intake is obtained with decreasing velocity may be readily determined. Above this point the proportion of fish which cannot escape from the current increases proportionally with increase in the velocity. The competing consideration is, of course, that the larger the intake velocity the smaller and less expensive will be the intake structure. It is then simply a matter of economics to size the intake structure so that the velocity of the flow in the intake channel is at the determined minimum or some larger value. Of course, selection of the higher value will result in proportionally more fish being drawn into the system but it may be possible to remove them from the water intake system by other means. The improved intake structure of the invention, of course, is particularly suitable for use in bodies of water wherein the primary species of fish expected to be encountered are those which react negatively to increases in horizontal velocity by moving away therefrom.

Once the desired intake velocity is chosen, the volumetric flow rate of water required to be drawn in by the intake system will determine the height the velocity cap is mounted over the intake orifice, i.e., the distance A. The intake orifice is then provided with an outwardly extending substantially horizontal lip along those portions of the periphery of the intake orifice over which the water flows and the velocity cap is sized to extend over a sufficient area of the intake orifice and lip to define an intake channel between the velocity cap and the lip. The relative sizes of the velocity cap and lip surfaces is not important so long as the coextensive surfaces are dimensioned to provide an intake channel large enough to permit fish to sense the horizontal velocity and swim out of the channel before coming into such close proximity with the intake orifice that they are drawn into it. The width of the lip should be a sufficient multiple of the distance A that the velocity profile on a vertical line from a point on the lip surface near the periphery of the channel to a point directly above on the velocity cap surface is substantially uniform, i.e., does not vary more than about 0.3 feet per second at any two points when the intake velocity is approximately 2.0 feet per second.

The parameters of the invention may readily be determined for any proposed water intake system. For example, for an intake structure to be located in the coastal waters of Southern California where the primary species of fish likely to be drawn into intake systems are northern anchovy, queen fish, white croaker, shiner perch, and walleye surfperch, it was readily determined that below a velocity of about 1.5 feet per second a smaller decrease in the number of fish of those species drawn into the system with the intake water was experienced with decreasing velocity. For the species of fish encountered it was then readily determined that a ratio of lip width to velocity cap height of 1.5 to 1 or more provided an intake channel wherein the water entered in a substantially uniform velocity profile annd the fish were provided with sufficient time to react to the horizontal velocity and swim back into the body of water before being drawn into the intake orifice. That ratio yielded the requisite profile and reaction time even at higher intake velocities, e.g., 1.75 feet per second.

The 1.5 to 1 ratio is not to be taken as an absolute minimum, since it was not attempted to find the absolute minimum ratio which provided acceptable results. Rather, tests were conducted at a ratio of 1 to 1 and unacceptable results were obtained. The next ratio tested was 1.5 to 1 which yielded acceptable results.

Therefore, even with the species of fish listed, it is within the scope of the invention to include intake structures which provide a substantially uniform velocity profile and sufficient reaction time even though the ratio of lip width to velocity cap height is less than 1.5 to 1. Furthermore, species of fish encountered in waters other than Southern California coastal waters may be substantially prevented from being drawn into intake systems at lip width to velocity cap height ratios considerably below 1.5 to 1 and even below 1 to 1. Of course, a ratio of greater than the minimum determined ratio may be provided within the scope of the invention since that would merely result in increasing the time the fish are in the intake channel and thus the time they have to react to the increased velocity.

As shown in FIGS. 1 and 2, in the preferred embodiment of the invention the intake orifice 2, lip 3, and velocity cap 5 are circular in design and open around the entire periphery of intake orifice 2 except for small support legs 7. Support legs 7 are placed on the interior of lip 3 near intake orifice 2 in order not to interfere with the velocity profile of the water flowing through channel 8. Of course, the circular design of the intake structure depicted in FIGS. 1 and 2 results in an increasing velocity of the water in channel 8 as it converges toward the center of the structure and is drawn into conduit 10. Therefore, the minimum velocity selected for the design of the intake structure is to be measured across a point from the periphery of lip 3 straight up to velocity cap 5. The increasing velocity of the water as it flows through intake channel 8 has been found not to effect the improved fish intake results obtained by the present invention.

Figure 3:
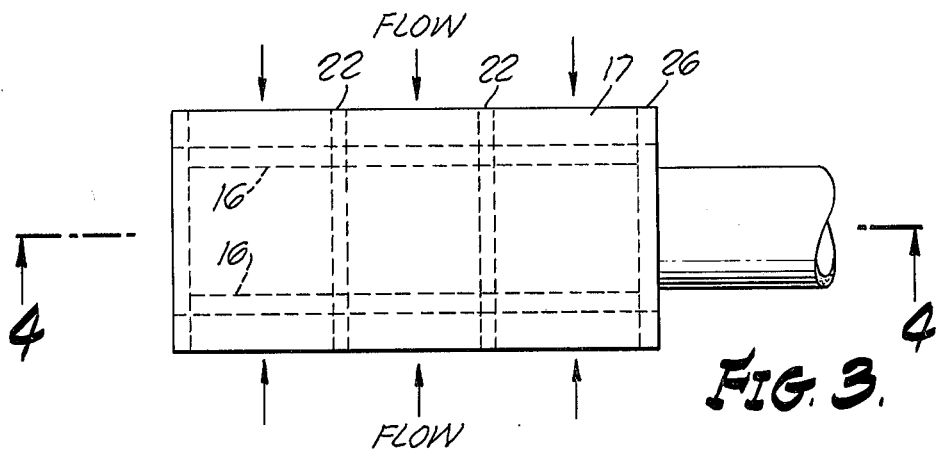
FIG. 3 is a top view of another embodiment of the intake structure of the invention featuring a rectangular cross-section.
Figure 4:
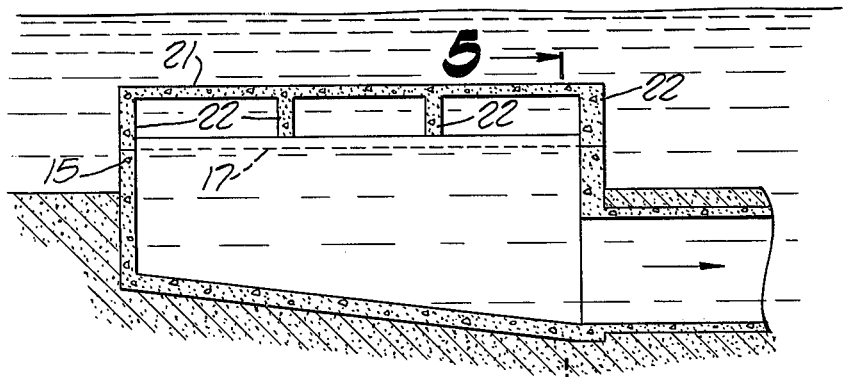
FIG. 4 is a cross-sectional view of the embodiment depicted in FIG. 3 taken along line 4—4.
Figure 5:
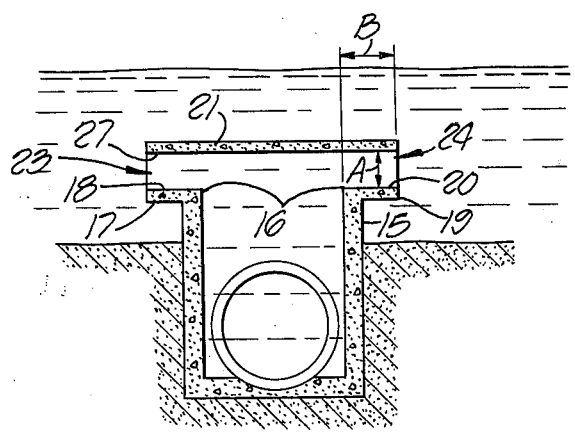
FIG. 5 is an end cross-sectional view of the embodiment of FIG. 3 taken along line 5—5 in FIG. 4.

FIGS. 3–5 depict yet another embodiment of the invention wherein an intake structure of rectangular design is provided. Referring to FIG. 5, intake conduit 15 is provided with intake orifice 16, lip 17 having upwardly facing substantially horizontal surface 18 and lip 19 having an upwardly facing substantially horizontal surface 20. A velocity cap 21 having a downwardly facing substantially horizontal surface 27 is mounted over intake conduit 15 and lips 17 and 19 by supports 22 to thereby define intake channels 23 and 24. the width B of lips 17 and 19 from their outer edge to intake orifice 16 is a sufficient multiple of the height A of surface 27 over lip surfaces 18 and 20 so that a substantially uniform horizontal velocity profile is established in the water flowing into the intake channels and fish drawn into the intake channel are provided with sufficient time to react to the velocity of the water and swim out of the intake channel. Distance A is determined by the same velocity considerations with respect to the species expected to be encountered in the body of water where the intake structure is located discussed above.

In order to determine whether an intake structure of the design of the invention provides improved results over conventional velocity cap intake structures, designs representative of both structures were constructed and tested against each other. The tests were carried out using northern anchovy (*Engraulis mordax*), white croaker (*Genyonemus lineatus*), and walleye surfperch (*Hyperprosopon argenteum*) which are representatives of species of fish found in Southern California coastal waters. These species also illustrate a range from small, relatively weak species such as anchovy to the stronger croaker and surfperch varieties.

It was first experimentally determined that for the variety of fish tested that intake velocity of the structures below 1.5 feet per second did not reduce fish intake in the same proportion as for velocities above 1.5 feet per second. However, economics dictated that the system for which the final intake structure was being designed would require an intake velocity of 1.75 feet per second and the tests were conducted at this intake velocity.

A representative sample of a conventional structure having a velocity cap mounted over an unlipped orifice was first fabricated. A second intake structure was then designed according to the invention. The velocity profile of the water in the intake channel of the second structure did not vary more than ±0.05 feet per second from the mean velocity. With the conventional unit, however, the velocity was as high as 2.5 feet per second.

The conventional velocity cap intake structure is known to reduce the intake of fish into a water intake system 80 to 90 percent over the number of fish taken in by an open structure. However, the tests demonstrated that the improved velocity cap of the invention reduced intake of anchovy by 60 to 70 percent above that obtained by the conventional capped structure and reduced the intake of croaker and surfperches by 75 percent.

Experiments were also conducted to determine if the increasing velocity through the intake channel which would be obtained by providing an intake structure of circular cross-section as described in FIGS. 1 and 2 would have any effect on the number of fish drawn into the system. These experiments demonstrated that the number of fish drawn into structures designed according to the invention and to simulate the increase in velocity expected with a circular intake structure did not materially deviate from the number drawn into a model of an intake structure of rectangular cross-section as depicted in FIGS. 3–5.

Having fully described our invention, it is to be understood that we do not wish to be limited to the details of the embodiments herein set forth or to the details illustrated in the drawings, but our invention is of the full scope of the appended claims.

We claim:

1. A water intake system for withdrawing water from a body of water containing fish comprising:
   intake channel means communicating with said body of water, the channel means being dimensioned such that a substantially uniform horizontal velocity profile is established in the water flowing in at least the portion of the channel means adjacent the inlet thereto; and
   conduit means including an intake orifice communicating with said intake channel,
   said intake orifice being positioned relative to the inlet of said intake channel means such that fish entering into said intake channel means are permitted a sufficient time to react to the flow of the water therein and exit therefrom before being drawn through said intake orifice.

2. A water intake system for withdrawing water from a body of water containing fish comprising:
   intake channel means communicating with said body of water, said intake channel means being defined by a pair of substantially parallel, substantially horizontal, substantially vertically spaced surfaces;
   conduit means terminating in an intake orifice formed in one of said surfaces and communicating with said intake channel means,
   said surfaces having an area and a spacing therebetween such that a substantially uniform horizontal velocity profile is established in the water flowing in said intake channel means adjacent the periphery of said surfaces and such that fish entering into said intake channel means are permitted a sufficient time to react to the flow of the water therein and exit therefrom before being drawn through said intake orifice.

3. The system of claim 2 wherein a first of said surfaces comprises a lip formed on said conduit means around said intake orifice and the other of said surfaces comprises a cap member mounted on said lip.

4. The system of claim 3 wherein said cap member is positioned above said lip.

5. The system of claim 4 wherein said lip is circular in configuration.

6. The system of claim 4 wherein said lip is rectangular in configuration.

7. A water intake system for withdrawing water from a body of water containing fish, comprising an intake conduit communicating with the body of water having an intake orifice, a first substantially horizontal surface substantially vertically spaced from said orifice and a substantially horizontal peripheral second surface extending outwardly from said orifice, said surfaces defining therebetween an intake channel through which water flows into said orifice the length of said channel being a sufficient multiple of the vertical distance between said surfaces to establish a substantially uniform horizontal velocity profile of the water flowing into said intake channel whereby fish drawn into the intake channel toward the orifice are permitted a sufficient time to react to the flow of the water into said orifice to avoid being drawn therein.

8. The system of claim 2 wherein said horizontal velocity profile is such that the velocity of water at any two points on said velocity profile does not vary more than about 0.3 feet per second.

9. The system of claim 3 wherein the width of said lip is about at least 1.5 times the spacing between the lip surface and said cap member.

10. The system of claim 9 wherein the velocity of the water flowing in said intake channel means adjacent the periphery of said surfaces is from about 1.5 feet per second to about 1.75 feet per second.

11. A method of preventing fish from being drawn into an intake orifice of a water intake system communicating with a body of water comprising establishing a zone of flowing water having a substantially uniform horizontal velocity profile between said body of water and said orifice, said zone extending away from said orifice a distance sufficient to permit fish entering said zone sufficient time to react to the flow of water therein and exit therefrom before being drawn through said orifice.

12. The method of claim 12 wherein said horizontal velocity profile does not vary more than about 0.3 feet per second when the velocity is about 2.0 feet per second.

13. A water intake system for withdrawing water from a body of water containing fish comprising:
intake channel means communicating with said body of water, said intake channel means being defined by a pair of substantially parallel, substantially horizontal, substantially vertically spaced surfaces;
conduit means terminating in an intake orifice formed in one of said surfaces and communicating with said intake channel means;
said surfaces having an area and a spacing therebetween such that a substantially uniform horizontal velocity profile is established in the water flowing in said intake channel means adjacent the periphery of said surfaces, the velocity of the water at any two points on said velocity profile not varying more than about 0.3 feet per second, and such that fish entering into said intake channel means are permitted a sufficient time to react to the flow of the water therein and exit therefrom before being drawn through said intake orifice.

14. The system of claim 13, wherein one of said surfaces comprises a lip formed on said conduit means around said intake orifice and the other of said surfaces comprises a cap member mounted on said lip.

15. The system of claim 14, wherein the width of said lip is about at least 1.5 times the spacing between the lip surface and said cap member.

16. The system of claim 15, wherein the velocity of the water flowing in said intake channel means adjacent the periphery of said surfaces is from about 1.5 feet per second to about 1.75 feet per second.

17. A method of preventing fish from being drawn into an intake orifice of a water intake system communicating with a body of water comprising establishing, between said body of water and said orifice, a zone of flowing water having a substantially uniform horizontal velocity profile wherein the velocity of the water at any two points on said velocity profile does not vary more than about 0.3 feet per second when the velocity is about 2.0 feet per second, said zone extending away from said orifice a distance sufficient to permit fish entering said zone sufficient time to react to the flow of water therein and exit therefrom before being drawn through said orifice.

* * * * *